(12) United States Patent
Rouleau

(10) Patent No.: US 11,677,227 B2
(45) Date of Patent: Jun. 13, 2023

(54) DUAL TONGUE STRAP CLEAT BRACKET

(71) Applicant: Panduit Corp., Tinley Park, IL (US)

(72) Inventor: Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/447,309

(22) Filed: Sep. 10, 2021

(65) Prior Publication Data
US 2023/0083066 A1   Mar. 16, 2023

(51) Int. Cl.
*H02G 3/32* (2006.01)
*F16L 3/233* (2006.01)
*H02G 3/04* (2006.01)
*H02G 3/30* (2006.01)

(52) U.S. Cl.
CPC ............... *H02G 3/32* (2013.01); *F16L 3/233* (2013.01); *H02G 3/0456* (2013.01); *H02G 3/30* (2013.01)

(58) Field of Classification Search
CPC .......... H02G 3/32; H02G 3/30; H02G 3/0456; F16L 3/233
See application file for complete search history.

(56) References Cited

U.S. PATENT DOCUMENTS

| | | | |
|---|---|---|---|
| 2,387,951 A * | 10/1945 | Slater | F16L 3/227 248/68.1 |
| 2,682,384 A | 6/1954 | Eichelberger | |
| 2,923,510 A | 2/1960 | Walch | |
| 3,087,700 A | 4/1963 | Carpenter et al. | |
| 3,185,420 A | 5/1965 | Stewart | |
| 3,334,851 A * | 8/1967 | Cassidy | F16L 3/23 248/62 |
| 3,633,857 A * | 1/1972 | Logan | F16L 3/14 248/62 |
| 4,128,923 A * | 12/1978 | Bisbing | F16B 21/04 411/339 |
| 4,263,952 A * | 4/1981 | Kowalski | F16B 37/046 411/116 |
| 4,502,743 A * | 3/1985 | Ziegler | H01R 4/646 439/98 |
| 4,524,936 A * | 6/1985 | Hurtubise | F16L 3/133 248/62 |
| 4,770,378 A * | 9/1988 | Onishi | F16L 3/227 248/68.1 |

(Continued)

OTHER PUBLICATIONS

Caddy AO Offset Angled Bracket; Gordon Electric Supply, Inc., webpage location: https://www.gordonelectricsupply.com/p/Caddy-Ao-Offset-Angle-Bracket/5640808?text=78285628100&lsi=true; printed Sep. 10, 2021; 3 pages.

*Primary Examiner* — Jonathan Liu
*Assistant Examiner* — Taylor Morris
(74) *Attorney, Agent, or Firm* — Christopher S. Clancy; James H. Williams; Aimee E. McVady

(57) ABSTRACT

A bracket secured to a support member. The bracket receives a locking strap cleat to secure a cable bundle to the support member. The bracket has a first tongue, a second tongue parallel to the first tongue, and a riser section connecting the first tongue and the second tongue. The first tongue and the second tongue include slots. The first tongue of the bracket receives one of the cable bundle or the support member and the second tongue of the bracket receives one of the cable bundle or the support member.

4 Claims, 14 Drawing Sheets

(56) References Cited

U.S. PATENT DOCUMENTS

| | | | | |
|---|---|---|---|---|
| 4,960,253 A * | 10/1990 | Perrault | ............... | H02G 3/263 |
| | | | | 248/68.1 |
| 5,154,385 A * | 10/1992 | Lindberg | ............. | A47B 57/562 |
| | | | | 248/245 |
| 5,221,065 A | 6/1993 | Siems et al. | | |
| 5,295,646 A * | 3/1994 | Roth | ........................ | F16L 3/133 |
| | | | | 248/62 |
| 5,372,341 A * | 12/1994 | Witherbee | ............... | H02G 3/263 |
| | | | | 411/84 |
| 5,632,457 A * | 5/1997 | Neely, Jr. | ................. | F16L 3/233 |
| | | | | 248/69 |
| 5,687,941 A * | 11/1997 | Quintile | .................... | E06C 7/14 |
| | | | | 248/210 |
| 5,769,365 A * | 6/1998 | Onishi | ................... | H02G 3/263 |
| | | | | 411/84 |
| 5,797,573 A * | 8/1998 | Nasu | ........................ | H02G 3/32 |
| | | | | 248/228.2 |
| 5,897,082 A * | 4/1999 | Losada | ..................... | F16L 3/04 |
| | | | | 248/65 |
| 6,343,771 B1 * | 2/2002 | Simon | ................... | H02G 3/0456 |
| | | | | 403/230 |
| 6,354,542 B1 * | 3/2002 | Meyer | ..................... | F16L 3/243 |
| | | | | 248/68.1 |
| 6,415,560 B1 * | 7/2002 | Rinderer | ................... | F16B 7/18 |
| | | | | 403/220 |
| 6,588,711 B2 * | 7/2003 | Onishi | .................. | F16B 37/045 |
| | | | | 248/221.11 |
| 7,651,056 B2 * | 1/2010 | Tjerrild | ................... | F16L 3/227 |
| | | | | 248/62 |
| 7,789,359 B2 * | 9/2010 | Chopp, Jr. | ........... | H02G 3/0456 |
| | | | | 248/210 |
| 8,540,191 B2 | 9/2013 | Sabadie et al. | | |
| 8,813,452 B2 * | 8/2014 | Kellerman | .............. | F24S 25/61 |
| | | | | 52/173.3 |
| 9,347,589 B1 * | 5/2016 | Oh | ........................... | F16L 3/22 |
| 9,548,598 B2 | 1/2017 | Tally et al. | | |
| 9,587,433 B2 | 3/2017 | Sylvester et al. | | |
| 9,882,365 B2 | 1/2018 | Sylvester et al. | | |
| 10,008,841 B2 | 6/2018 | Rouleau | | |
| 10,407,985 B2 | 9/2019 | Sylvester et al. | | |
| 10,731,778 B2 * | 8/2020 | Brouwer | .................. | F16L 3/23 |
| 10,746,216 B2 * | 8/2020 | Tjerrild | ................. | F16B 13/003 |
| 10,811,857 B2 | 10/2020 | Rouleau | | |
| 2010/0072337 A1 * | 3/2010 | Akiyama | ................... | F16B 43/00 |
| | | | | 248/224.7 |
| 2010/0260573 A1 * | 10/2010 | Gardner | .................... | F16L 3/04 |
| | | | | 248/74.1 |
| 2014/0014407 A1 * | 1/2014 | Krieg | ..................... | F16G 11/06 |
| | | | | 24/135 R |
| 2014/0061412 A1 * | 3/2014 | Suzuki | .................... | F16B 37/02 |
| | | | | 248/226.11 |
| 2014/0239131 A1 * | 8/2014 | Sylvester | ................ | H02G 3/32 |
| | | | | 248/68.1 |
| 2015/0255971 A1 * | 9/2015 | Dean | ........................ | F16L 3/26 |
| | | | | 248/58 |
| 2017/0267191 A1 * | 9/2017 | Chambosse | ............... | F16B 2/08 |
| 2017/0317480 A1 * | 11/2017 | Rouleau | ...................... | H02G 3/32 |
| 2019/0376626 A1 * | 12/2019 | Walton | ...................... | F16L 3/23 |
| 2020/0059075 A1 * | 2/2020 | Rouleau | ................... | H02G 3/32 |
| 2020/0091643 A1 * | 3/2020 | Smith | ....................... | F16B 7/0493 |
| 2020/0096135 A1 * | 3/2020 | Witherbee | ................. | F16L 3/18 |
| 2020/0216241 A1 * | 7/2020 | Hong | ........................ | H02G 3/32 |
| 2020/0347962 A1 * | 11/2020 | Smith | ....................... | F16L 3/04 |
| 2021/0151970 A1 * | 5/2021 | Robinson | .................. | H02G 3/32 |
| 2021/0324939 A1 * | 10/2021 | Rouleau | .................... | H02G 3/32 |
| 2021/0332912 A1 * | 10/2021 | Rohder | .................. | H02G 3/0456 |
| 2021/0396333 A1 * | 12/2021 | Kossak | .................... | F16L 3/137 |
| 2022/0090734 A1 * | 3/2022 | Atakan | ..................... | F16L 3/12 |

\* cited by examiner

DUAL TONGUE STRAP CLEAT BRACKET

FIELD OF THE INVENTION

The present invention relates to a bracket, and more particularly to a dual tongue strap cleat bracket for a locking strap cleat, bracket strap cleat, or other strap cleats, used to secure cables to strut rungs of a ladder rack.

BACKGROUND OF THE INVENTION

Conventional cable cleats have been typically used to secure wire or cable bundles to panels, ladder racks, or similar structural support members. The cable cleats include a mounting surface and a body portion that receives the wires or a cable bundle. Conventional cable cleats, however, are generally difficult and time consuming to install. Thus, it is desirable to provide a bracket that is efficiently installed thereby significantly reducing labor costs and increasing productivity.

SUMMARY OF THE INVENTION

The present invention is directed to a bracket that is designed to receive a locking strap cleat, a buckle strap cleat, or a strap cleat having other locking mechanisms, and that is designed to be secured to a support member. The bracket includes a first tongue, a second tongue parallel to the first tongue, and a riser section connecting the first tongue and the second tongue. The first and second tongues each include a slot for receiving a fastener. The first tongue is adapted to receive one of the cables and the locking strap cleat or the support member and the second tongue is adapted to receive one of the cables and the locking strap cleat or the support member.

DETAILED DESCRIPTION

Figure 1:
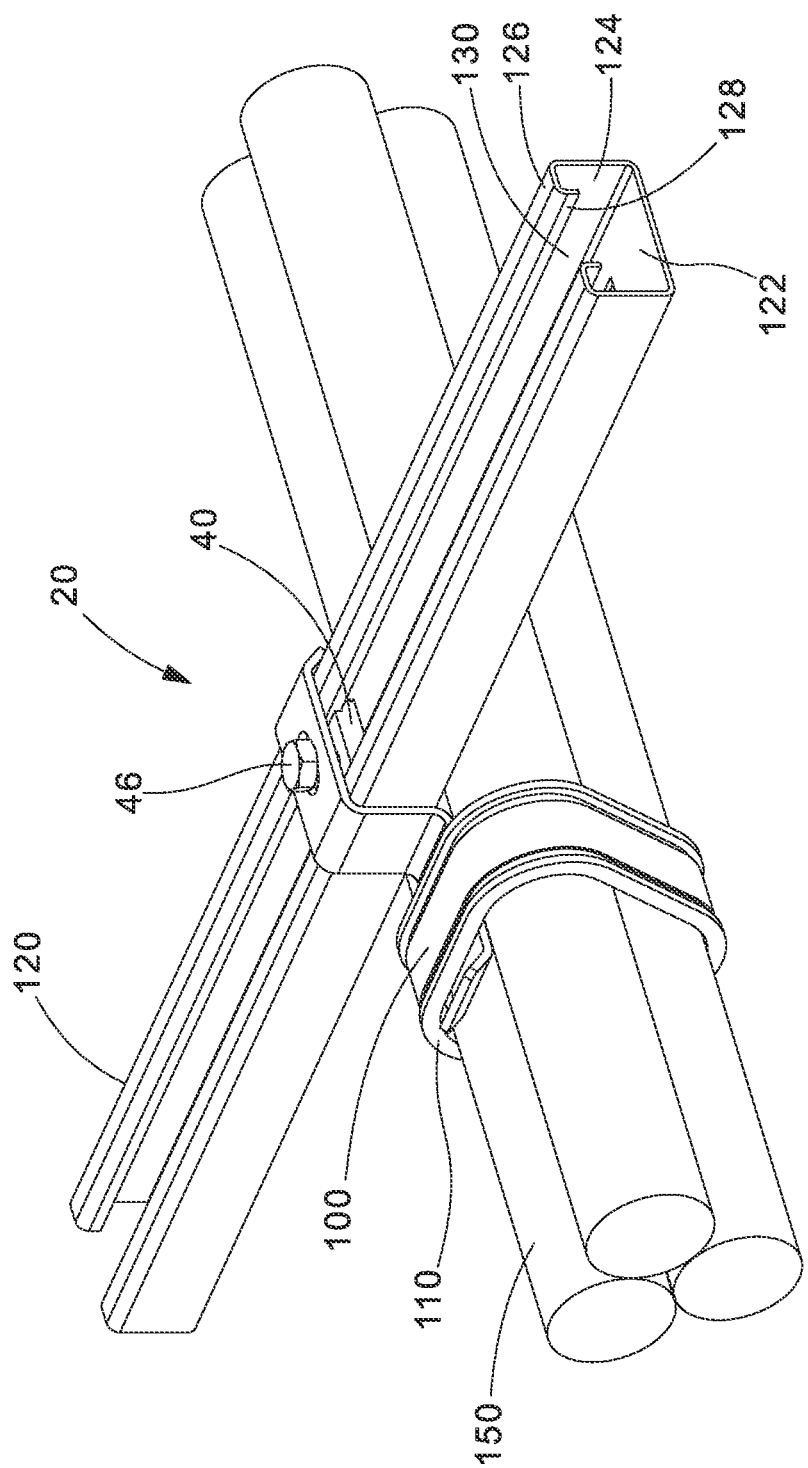
FIG. 1 is a perspective view of the dual tongue strap cleat bracket of the present invention and a locking strap cleat securing a trefoil cable configuration to a support member.

FIG. 1 illustrates the dual tongue strap cleat bracket 20, or dual tongue bracket, of the present invention and a locking strap cleat 100 securing a trefoil cable configuration to a support member 120, such as a strut rung of a ladder rack. The locking strap cleat is a stainless-steel strap secured by a ball-locking head for high retained tension (locking head not illustrated). The stainless-steel strap cleat may also be secured by a buckle (buckle strap cleat) or another locking mechanism. The strut rung 120 has a top member 122, two side walls 124, lower flanges 126 extending towards the center of the strut rung 120, inner flanges 128 extending from the lower flanges 126 towards the top member 122 of the strut rung 120, and an opening 130. The strut rung 120 may also include a plurality of openings 132 extending along the top member 122 (see FIG. 12). A cushion sleeve 110 is positioned, if desired, between the locking strap cleat 100 and cables 150 for added protection and to prevent damage to the cables 150.

The dual tongue bracket 20 is secured to the strut rung 120 by a standard strut nut 40 and bolt 46. The strut nut 40 includes two indentations 42 and a center threaded hole 44. However, as illustrated and discussed with respect to FIGS. 12-14, the dual tongue strap cleat bracket 20 may also be secured to the strut rung 120 by a standard nut 50 and bolt 52.

Figure 2:
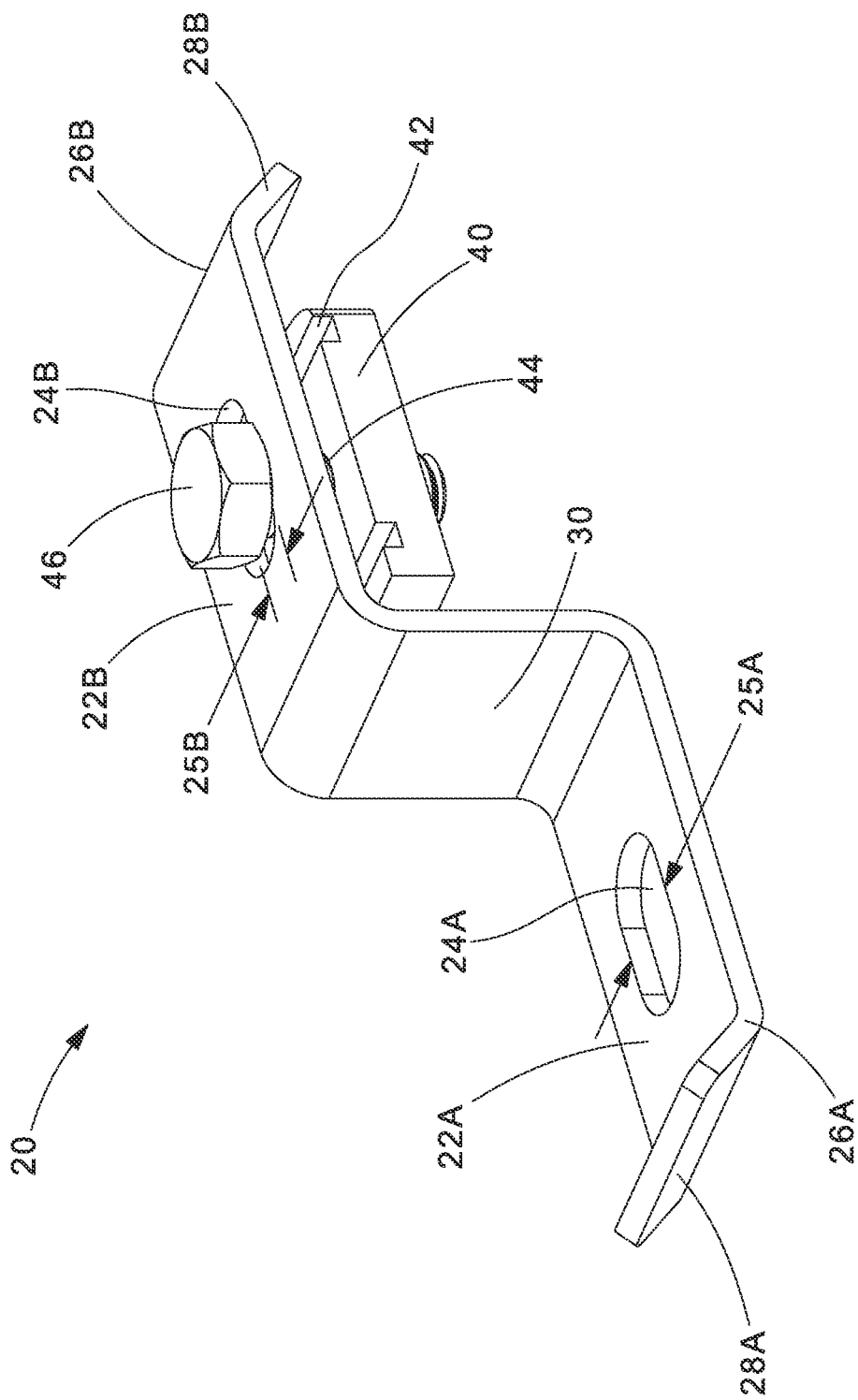
FIG. 2 is a perspective view of the dual tongue bracket of FIG. 1 with a strut nut and fastener.
Figure 3:
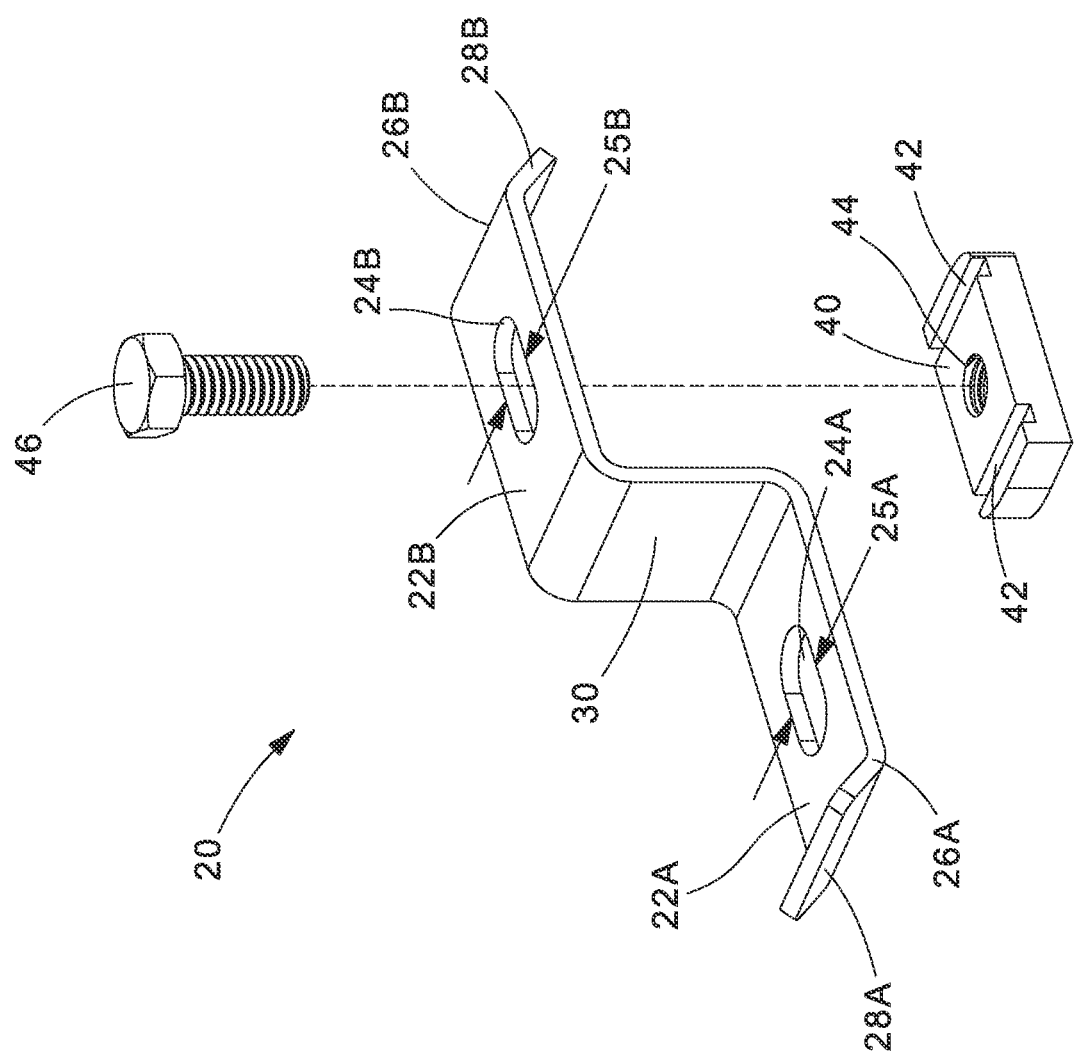
FIG. 3 is an exploded view of the dual tongue bracket, strut nut, and fastener of FIG. 2.
Figure 4:
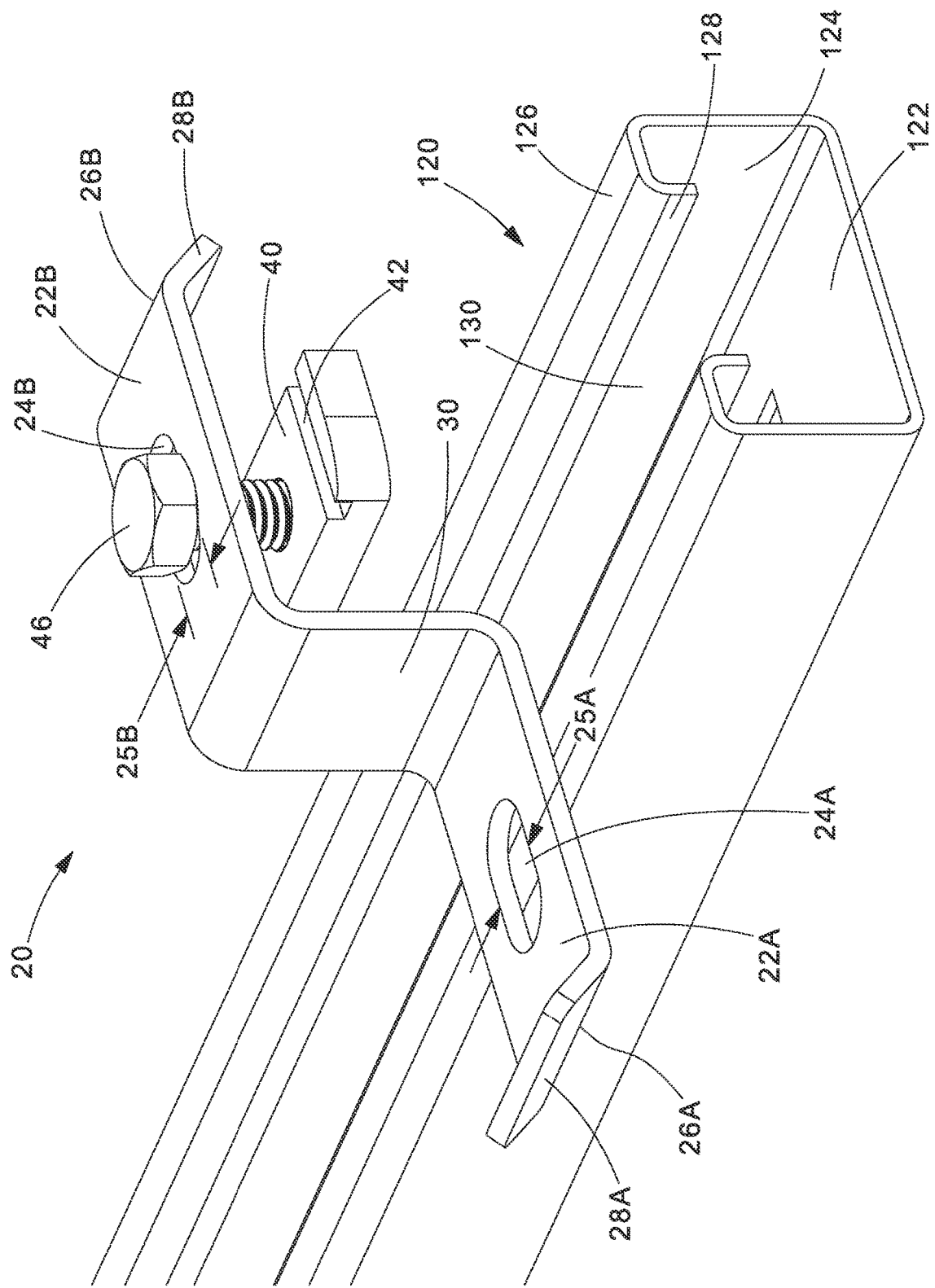
FIG. 4 is a perspective view of the dual tongue bracket, strut nut, and fastener of FIG. 2 positioned to be inserted in the support member.
Figure 5:
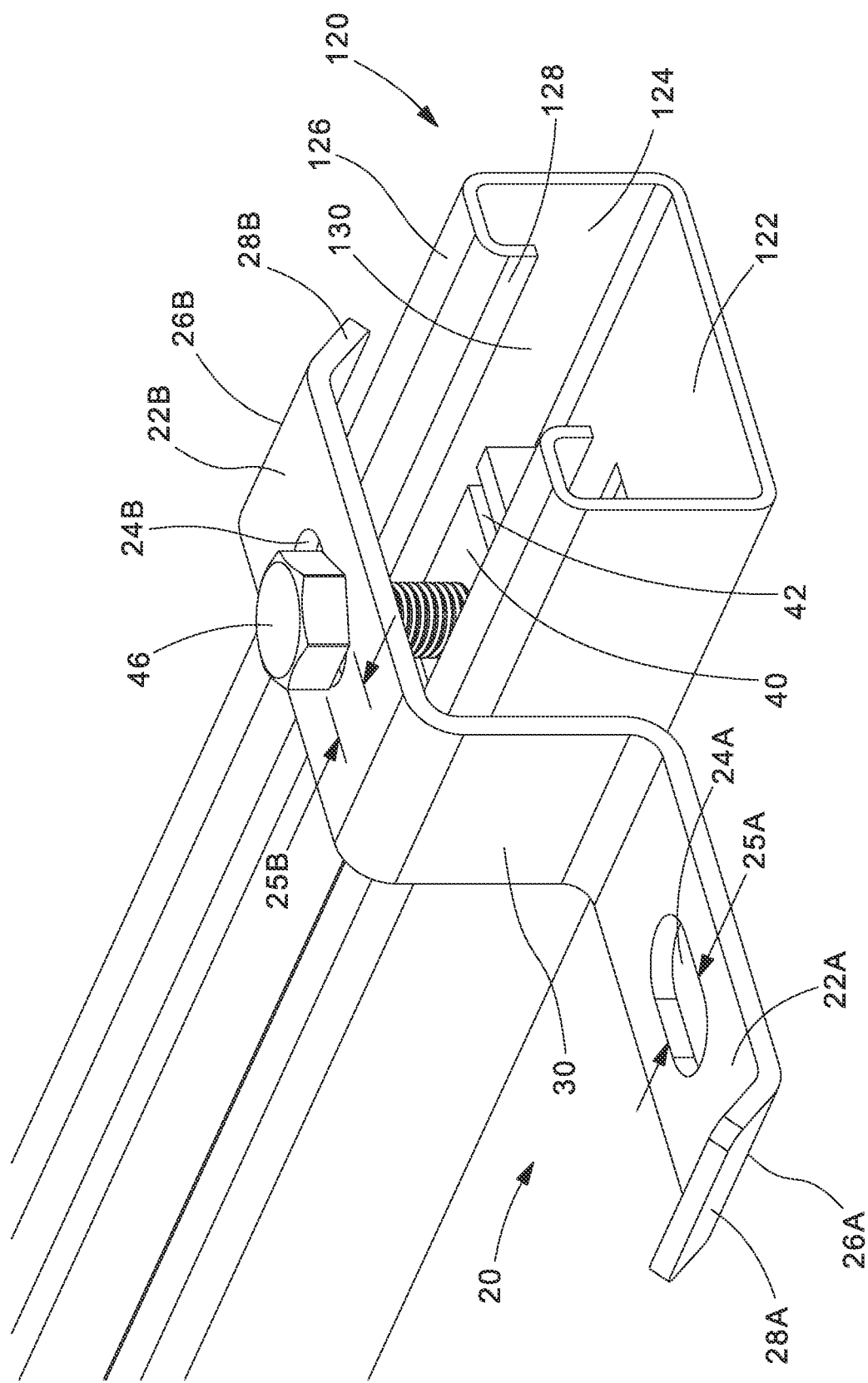
FIG. 5 is a perspective view of the dual tongue bracket, strut nut, and fastener of FIG. 2 partially installed on the support member.
Figure 6:
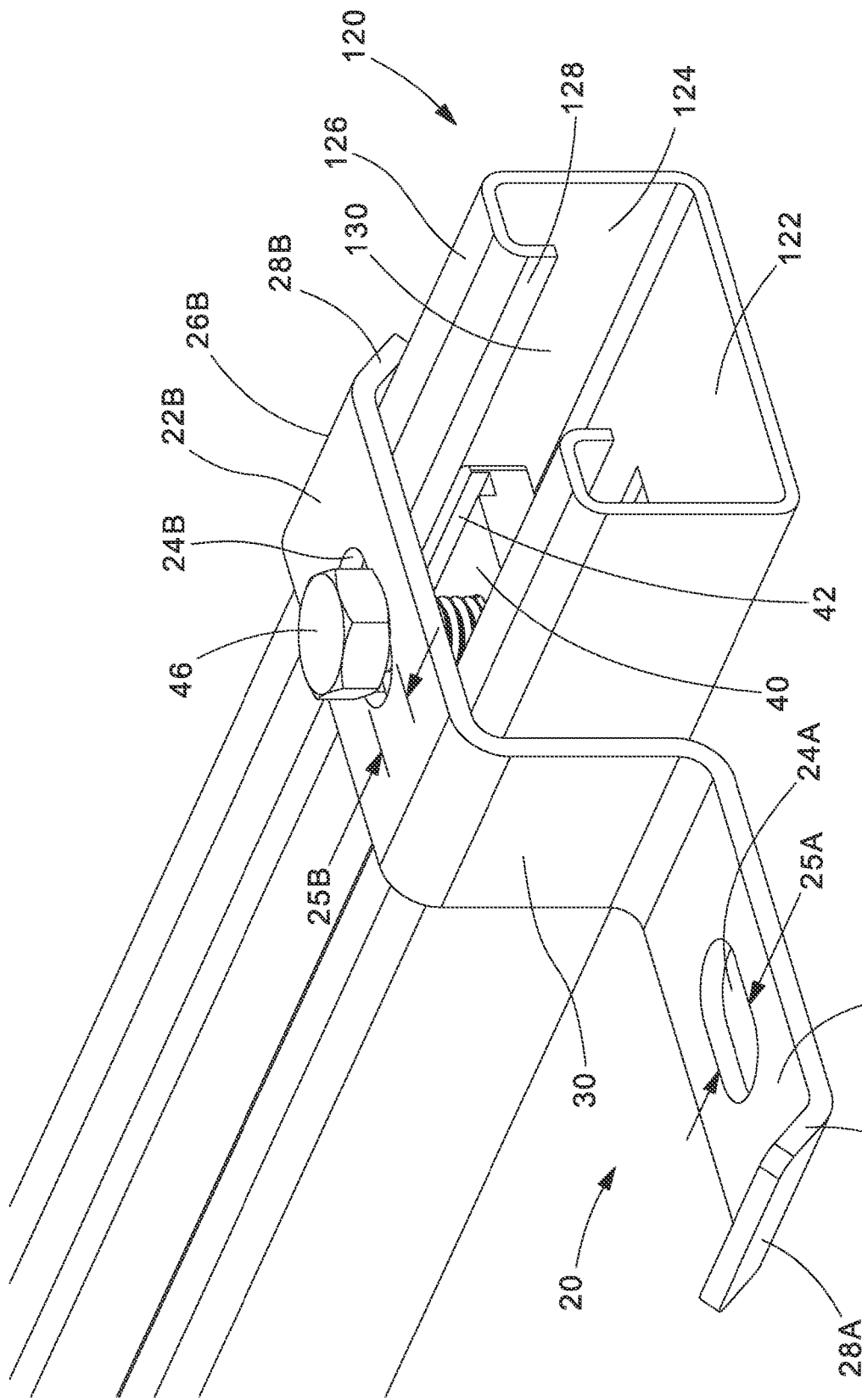
FIG. 6 is a perspective view of the dual tongue bracket, strut nut, and fastener of FIG. 2 partially installed on the support member with the strut nut rotated.

FIGS. 2 and 3 illustrate the dual tongue strap cleat bracket 20 with a strut nut 40 and fastener 46. The dual tongue strap cleat bracket 20 includes two tongues 22A, 22B that are connected by a riser section 30. The tongues 22A, 22B are parallel to each other. Each tongue 22A, 22B extends in a direction opposite of the other tongue. Each tongue 22A, 22B is designed so that it can be connected to a support member 120 or a locking strap cleat 100.

Each tongue 22A, 22B includes a slot 24A, 24B positioned at the center of the tongue 22A, 22B, respectively. The slot size in each tongue varies to accommodate fasteners of varying sizes. The slots 24A, 24B are designed to be used with either SAE or metric fasteners or hardware. For example, in the illustrated dual tongue bracket 20, the first slot 24A has a width 25A of 0.375 inch (10 mm) and the second slot 24B has a width 25B of 0.3125 inch (8 mm). The slot size and shape can be modified to accommodate customer requirements.

The dual tongue bracket 20 with varying slot sizes can accommodate different support member or strut rung widths providing installation flexibility. Additionally, the riser section 30 height can be modified to accommodate support members of various strut rung heights.

The dual tongue bracket 20 also includes retaining flanges 28A, 28B extending at an angle from the distal ends 26A, 26B of each tongue. As illustrated in FIGS. 2-3, one retaining flange 28B extends downwards from the upper tongue 22B and one retaining flange 28A extends upwards from the lower tongue 22A. The retaining flanges 28A, 28B are designed to keep the locking strap cleat 100 from sliding off of the dual tongue bracket 20.

Figure 7:
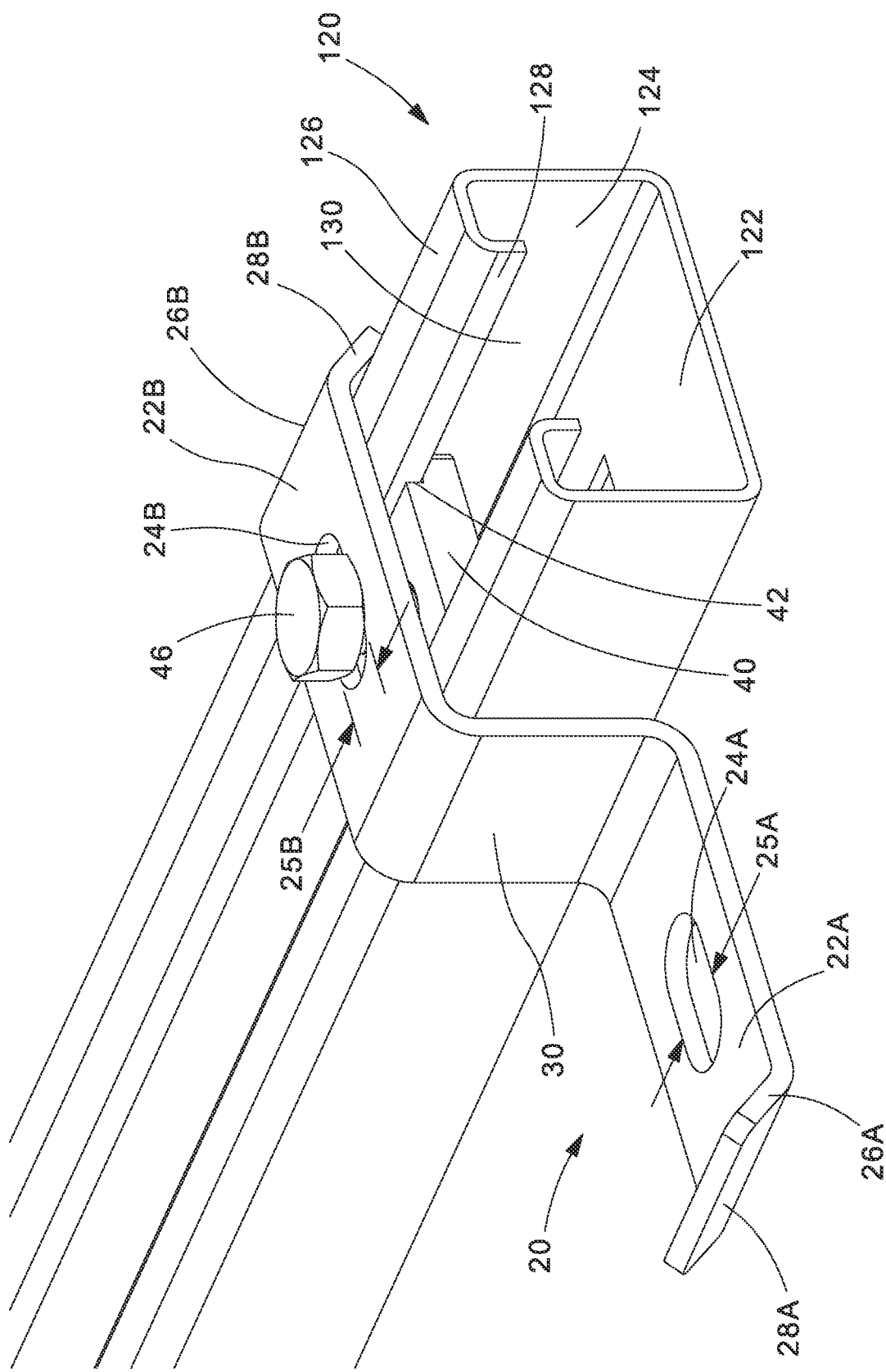
FIG. 7 is a perspective view of the dual tongue bracket, strut nut, and fastener of FIG. 2 installed on the support member.
Figure 8:
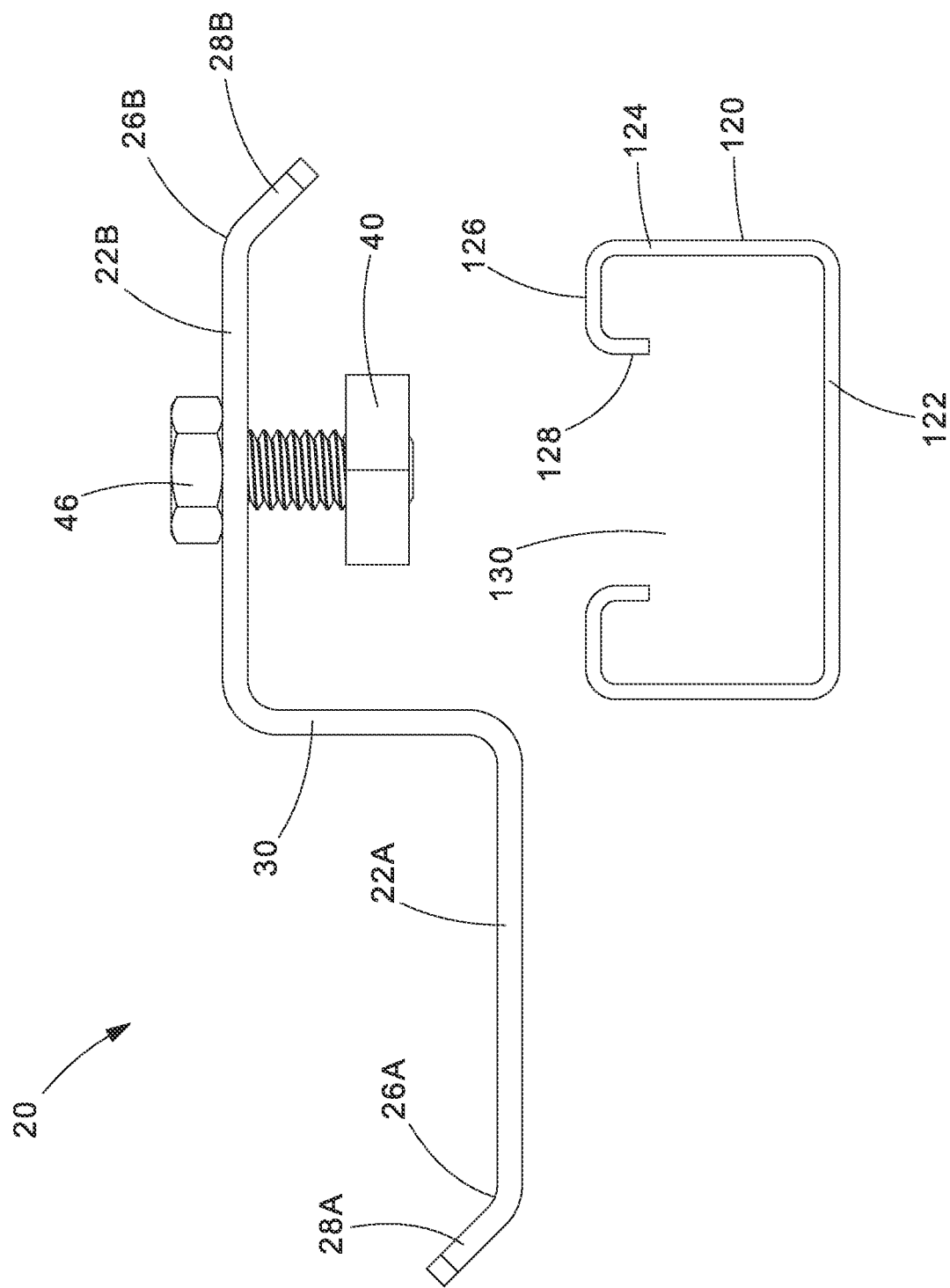
FIG. 8 is a side view of the dual tongue bracket, strut nut, and fastener of FIG. 3.
Figure 9:
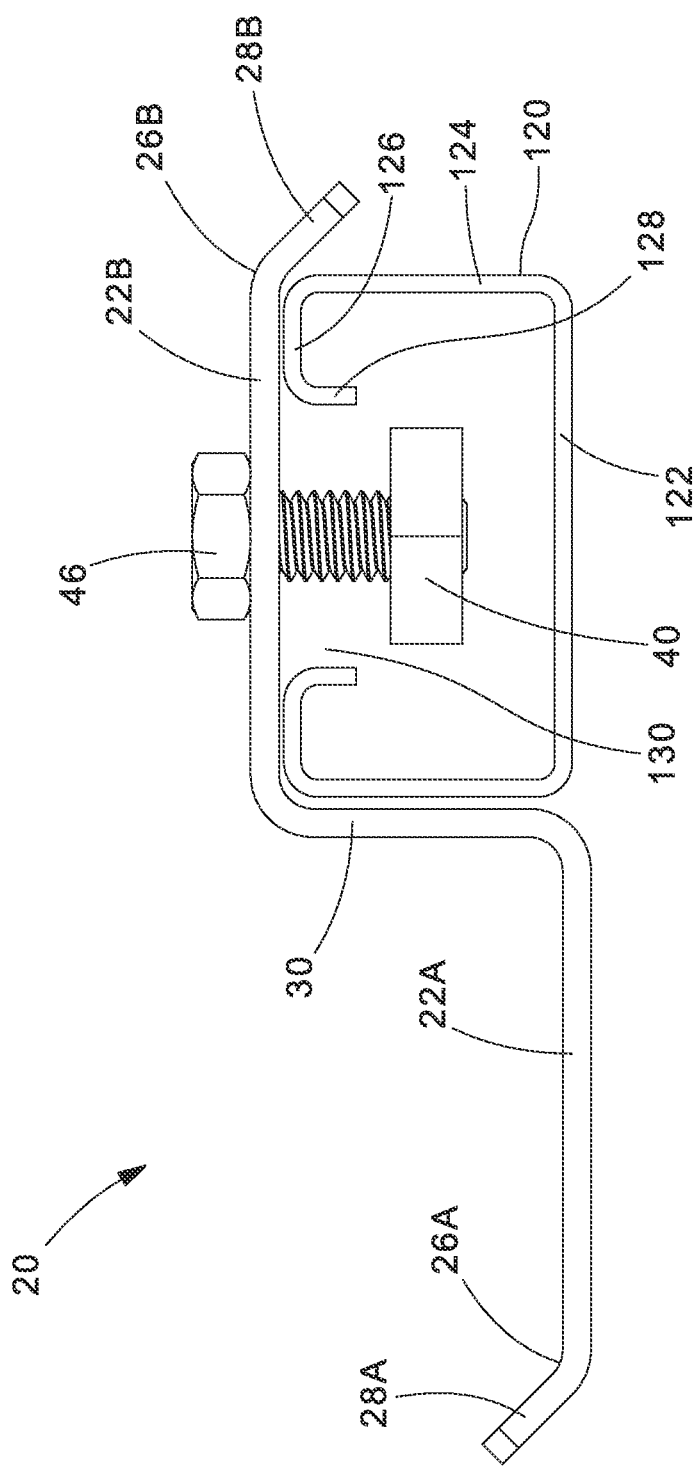
FIG. 9 is a side view of the dual tongue bracket, strut nut, and fastener of FIG. 5 partially installed on the support member.
Figure 10:
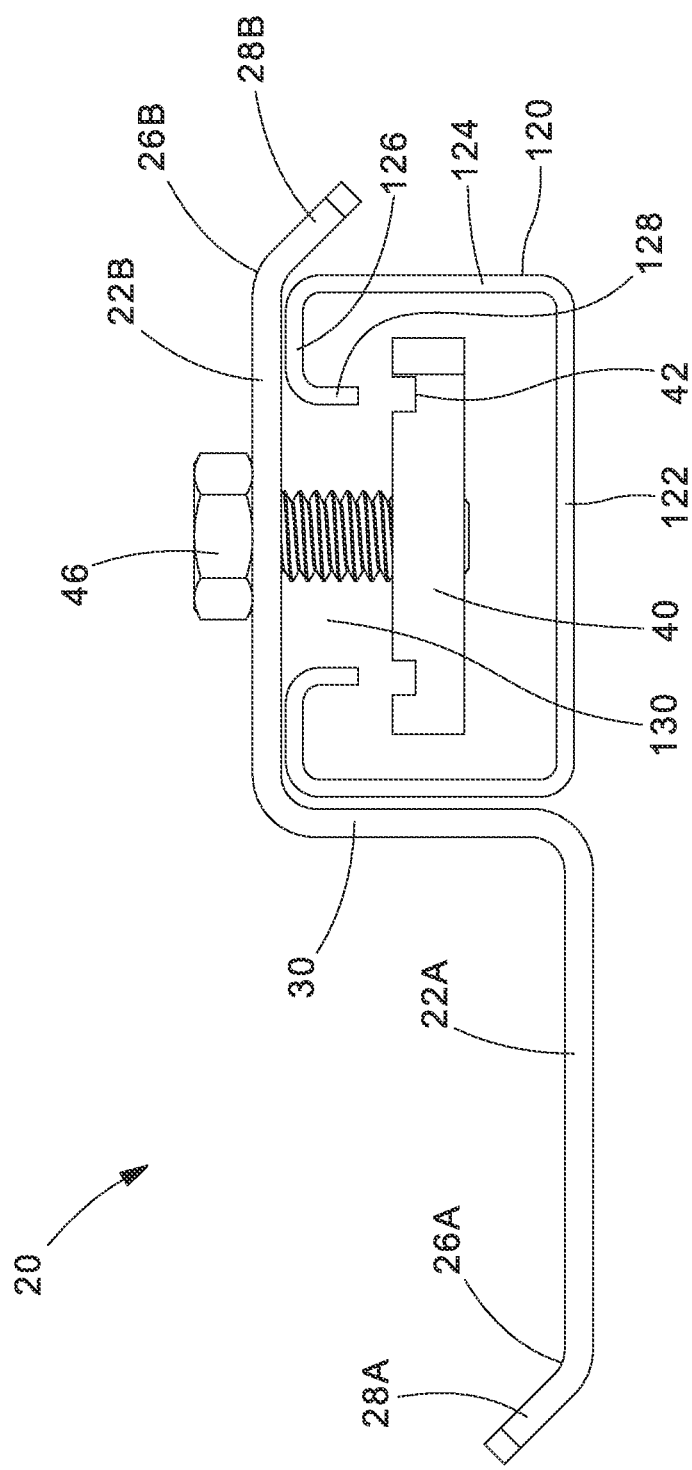
FIG. 10 is a side view of the dual tongue bracket, strut nut, and fastener of FIG. 6 partially installed on the support member with the strut nut rotated.
Figure 11:
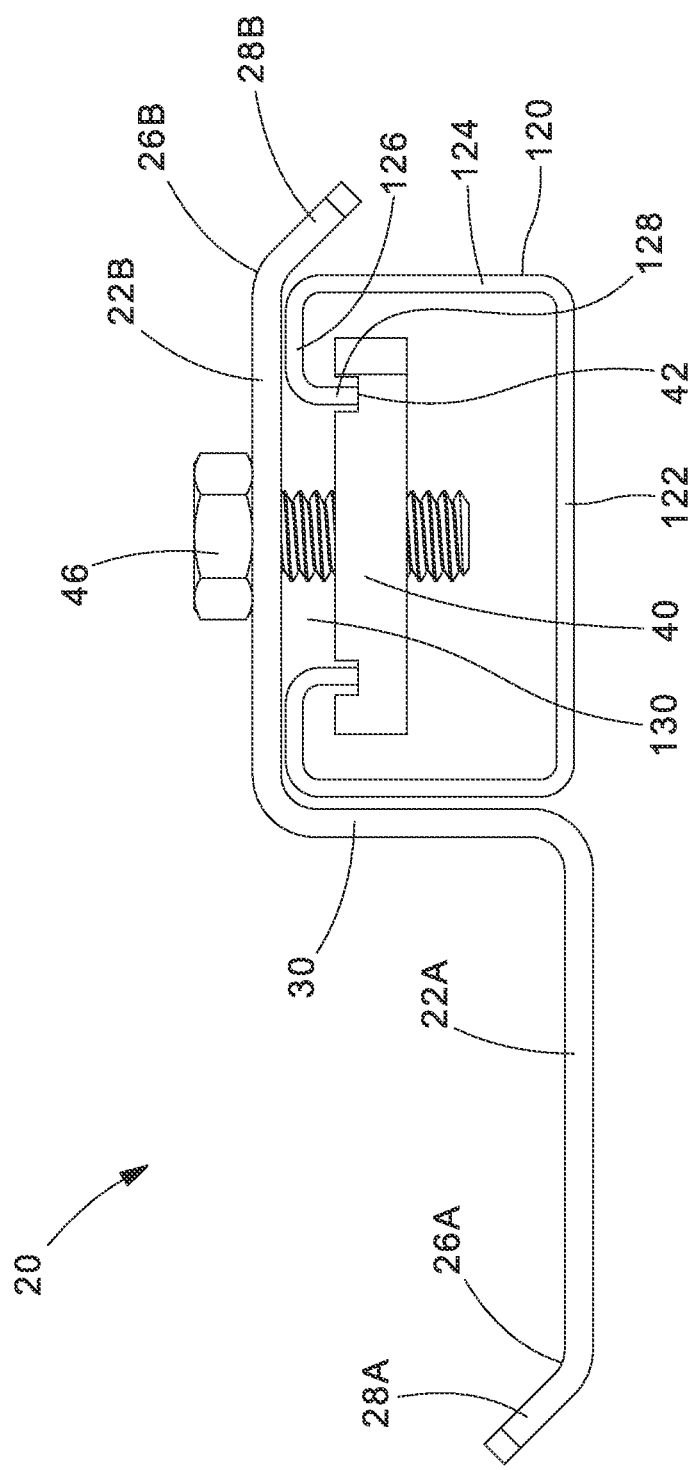
FIG. 11 is a side view of the dual tongue bracket, strut nut, and fastener of FIG. 7 installed on the support member.

FIGS. 4-11 illustrate the dual tongue strap cleat bracket 20 being installed onto the strut rung 120. In the illustrated example, the dual tongue bracket 20 is positioned with the tongue 22B having the desired slot size 24B located over the strut rung 120. However, the dual tongue bracket could be positioned with the slot 24A located over the strut rung 120. A fastener 46, such as a bolt, is positioned through the slot 24B of the dual tongue bracket 20 into a strut nut 40 and the strut nut 40 is rotated so that the strut nut 40 can be positioned in the strut rung 120. Once the strut nut 40 is installed in the strut rung 120 (FIG. 5), the bolt 46 and strut nut 40 are rotated (FIG. 6) so the indentations 42 in the strut nut 40 are positioned to receive the inner flanges 128 of the strut rung 120 (see FIGS. 6 and 10). As illustrated in FIGS. 7 and 11, the bolt 46 is tightened causing the strut nut 40 to engage the strut rung 120 and secure the dual tongue bracket 20 to the strut rung 120.

Once the dual tongue bracket 20 has been secured to the strut rung 120, a locking strap cleat 100 is used to secure cables to the dual tongue bracket 20. As illustrated in FIG. 1, a cushion sleeve 110 and a locking strap cleat 100 can be wrapped around the free or open tongue 22A to secure a trefoil cable configuration. Although a trefoil cable configuration is illustrated, the dual tongue bracket 20 and locking strap cleat 100 can secure various cable arrangements including single, double, trefoil, and quad cable arrangements.

Figure 12:
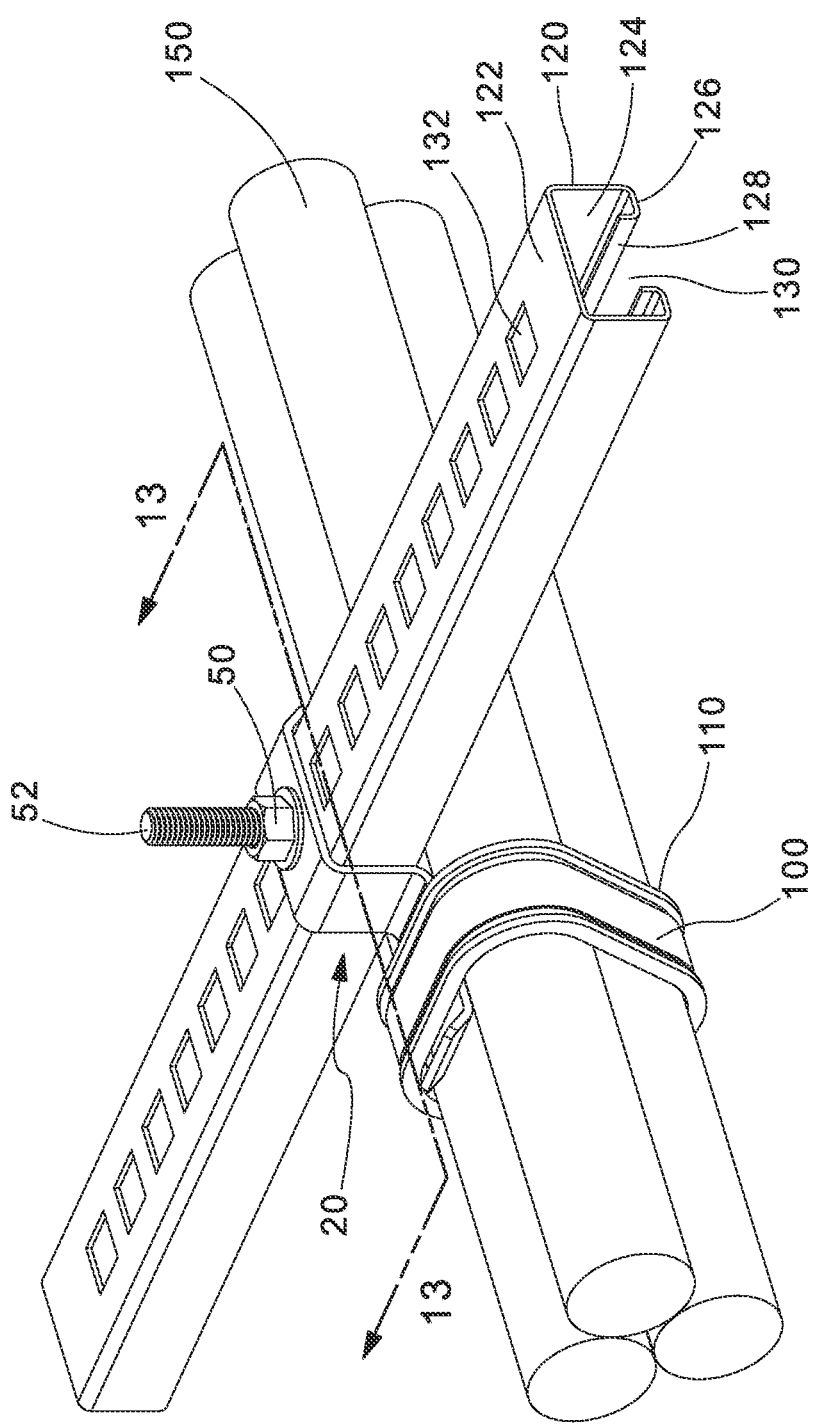
FIG. 12 is a perspective view of the dual tongue strap cleat bracket of the present invention and a locking strap cleat securing a trefoil cable configuration to a support member.
Figure 13:
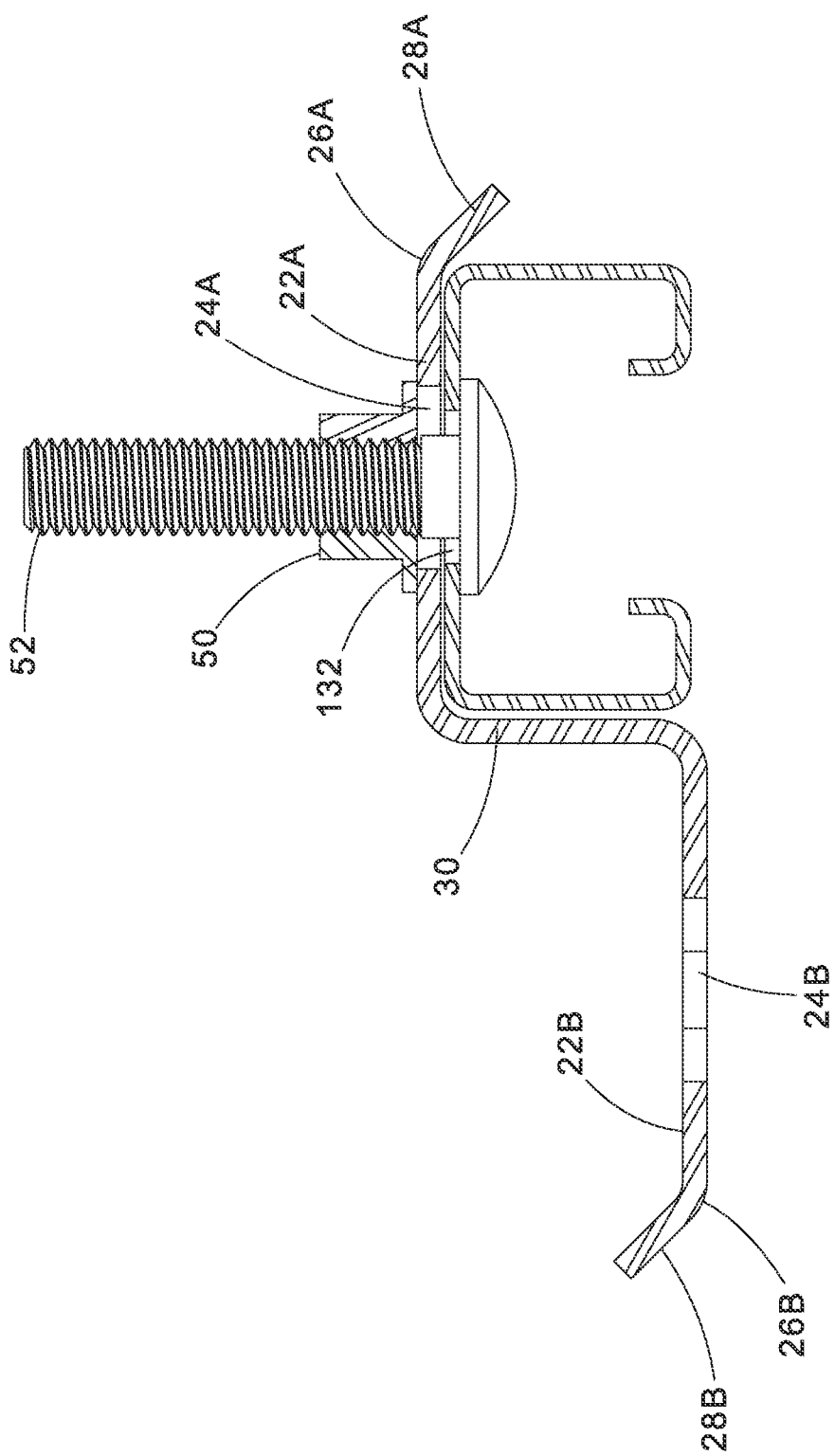
FIG. 13 is a cross sectional view of the dual tongue strap cleat bracket secured to a support member taken along line 13-13 of FIG. 12.
Figure 14:
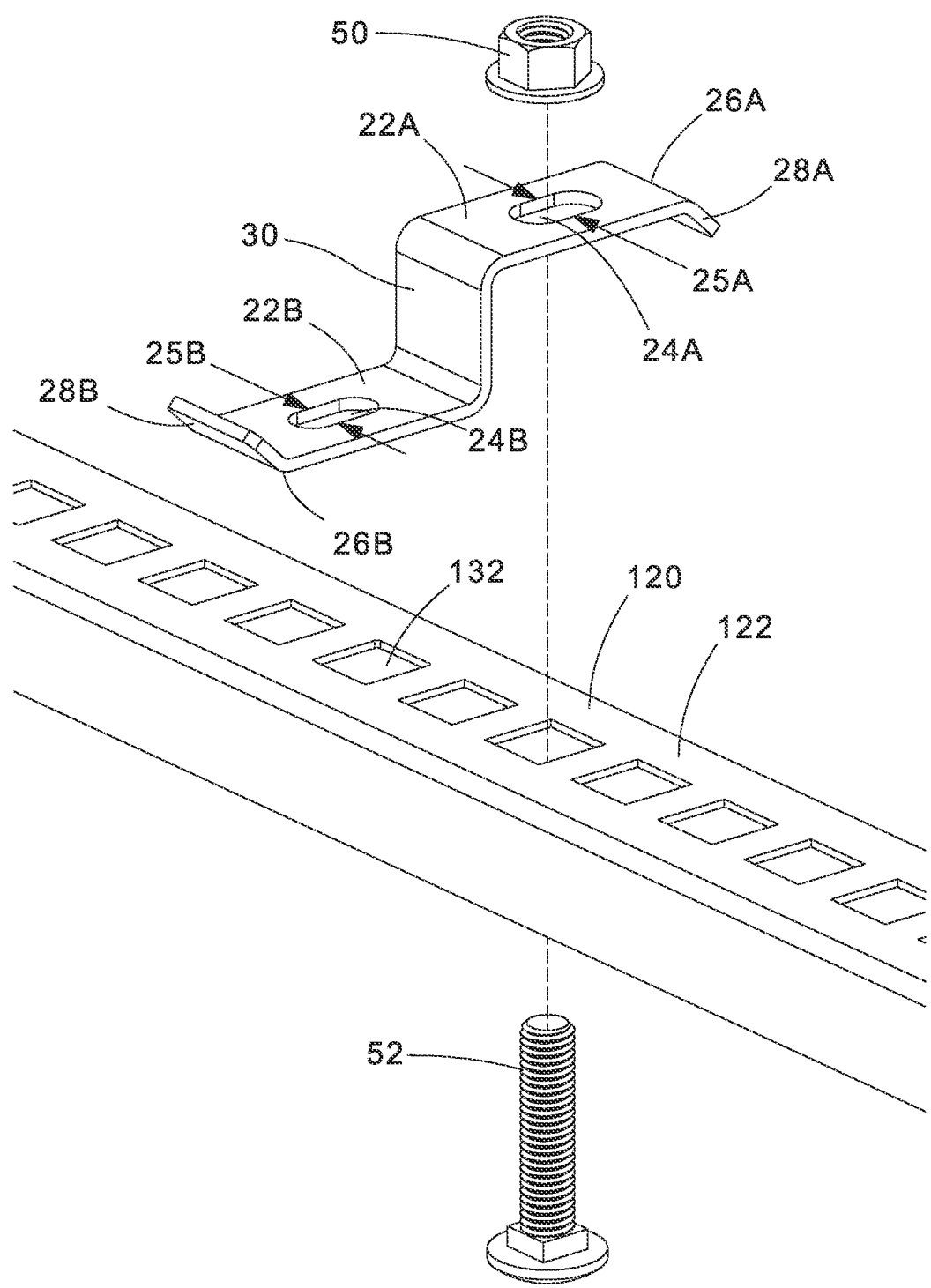
FIG. 14 is an exploded view of the dual tongue strap cleat bracket and support member of FIG. 12.

FIGS. 12-14 illustrate an alternative configuration with the dual tongue bracket 20 secured to the strut rung 120 by a standard nut 50 and bolt 52. This configuration is desirable if the end user does not want the bracket 20 to slide when a lateral force is applied. The standard nut 50 and bolt 52 secures the dual tongue bracket 20 to the strut rung 120 to prohibit lateral movement.

The dual tongue strap cleat bracket of the present invention provides many advantages over standard cleat brackets. The dual tongue strap cleat bracket is a low-cost, single piece bracket. The bracket is designed with two slot sizes per bracket which accommodates multiple support member widths. The slots are also designed to accept multiple fastener sizes. Additionally, the riser section of the bracket may be modified to accommodate various support member heights.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A cable bundling assembly comprising:
   a support member;
   at least one cable;
   a bracket having a first tongue receiving the at least one cable, a second tongue secured to the support member, and a riser section connecting the first tongue and the second tongue, wherein the first tongue of the bracket having a slot extending through the first tongue and the second tongue of the bracket having a slot extending through the second tongue; wherein the slot in the first tongue has a width greater than the slot in the second tongue;
   a locking strap cleat wrapped around the first tongue of the bracket for securing the at least one cable to the bracket; and
   wherein the support member has a top member, side walls, lower flanges, and inner flanges; and wherein the slot in the second tongue of the bracket receives a fastener to secure the second tongue of the bracket to the support member.

2. The cable bundling assembly of claim 1, wherein the first tongue extends from the riser section in a first direction and the second tongue extends from the riser section in a second direction opposite of the first direction.

3. The cable bundling assembly of claim 1, wherein a retaining flange extends at an angle from a distal end of the first tongue and a retaining flange extends at an angle from a distal end of the second tongue, wherein the retaining flange extending from the first tongue and the retaining flange extending from the second tongue extend in opposite directions.

4. The cable bundling assembly of claim 3, wherein the retaining flange extending from the distal of the first tongue extends upwardly away from the first tongue and the retaining flange extending from the distal end of the second tongue extends downwardly away from the second tongue.

* * * * *